United States Patent [19]

Kitajima et al.

[11] Patent Number: 5,543,962
[45] Date of Patent: Aug. 6, 1996

[54] BINOCULAR STEREOSCOPIC MICROSCOPE

[75] Inventors: Nobuaki Kitajima; Kazutoshi Takagi, both of Tokyo, Japan

[73] Assignee: Kabushiki Kaisha Topcon, Tokyo, Japan

[21] Appl. No.: 76,122

[22] Filed: Jun. 14, 1993

[30] Foreign Application Priority Data

Jun. 15, 1992 [JP] Japan .................................. 4-155419

[51] Int. Cl.$^6$ ........................ G02B 21/00; G02B 21/22
[52] U.S. Cl. ...................... 359/384; 359/368; 359/376
[58] Field of Search ................................ 359/376, 377, 359/375, 374, 834, 835, 836

[56] References Cited

U.S. PATENT DOCUMENTS

| 4,492,441 | 1/1985 | Hopkins | 359/377 |
| 4,518,231 | 5/1985 | Muchel et al. | 359/377 |
| 4,783,160 | 11/1988 | Tanaka | 359/377 |
| 5,227,914 | 7/1993 | Hunzawa et al. | 359/377 |

FOREIGN PATENT DOCUMENTS

| 3117858 | 1/1982 | Germany . | |
| 3718843 | 12/1987 | Germany . | |
| 61-100714 | 5/1986 | Japan | 359/376 |
| 4-156412 | 5/1992 | Japan | 359/376 |
| 5-27182 | 2/1993 | Japan | 359/376 |

*Primary Examiner*—Thong Q. Nguyen
*Attorney, Agent, or Firm*—Finnegan, Henderson, Farabow, Garrett & Dunner, L.L.P.

[57] ABSTRACT

A binocular stereoscopic microscope in which a prism 33 is provided for causing reflected light which has passed through an imaging lens 32 to undergo a plurality of reflections, and for guiding the light to the side of the optic axis of the imaging lens. A porroprism 35 is disposed near the prism 33 such that the light beam from the prism 33 is incident upon it. In this way, the range of operating angles can be increased, the operator has to extend his hands forward over a shorter distance, and the operator can work in a more comfortable position.

7 Claims, 12 Drawing Sheets

BINOCULAR STEREOSCOPIC MICROSCOPE

BACKGROUND OF THE INVENTION

1. Field of the Invention

This invention relates to a binocular stereoscopic microscope which enlarges an observation area viewed through both eyes of the observer.

2. Description of the Prior Art

Figure 12:
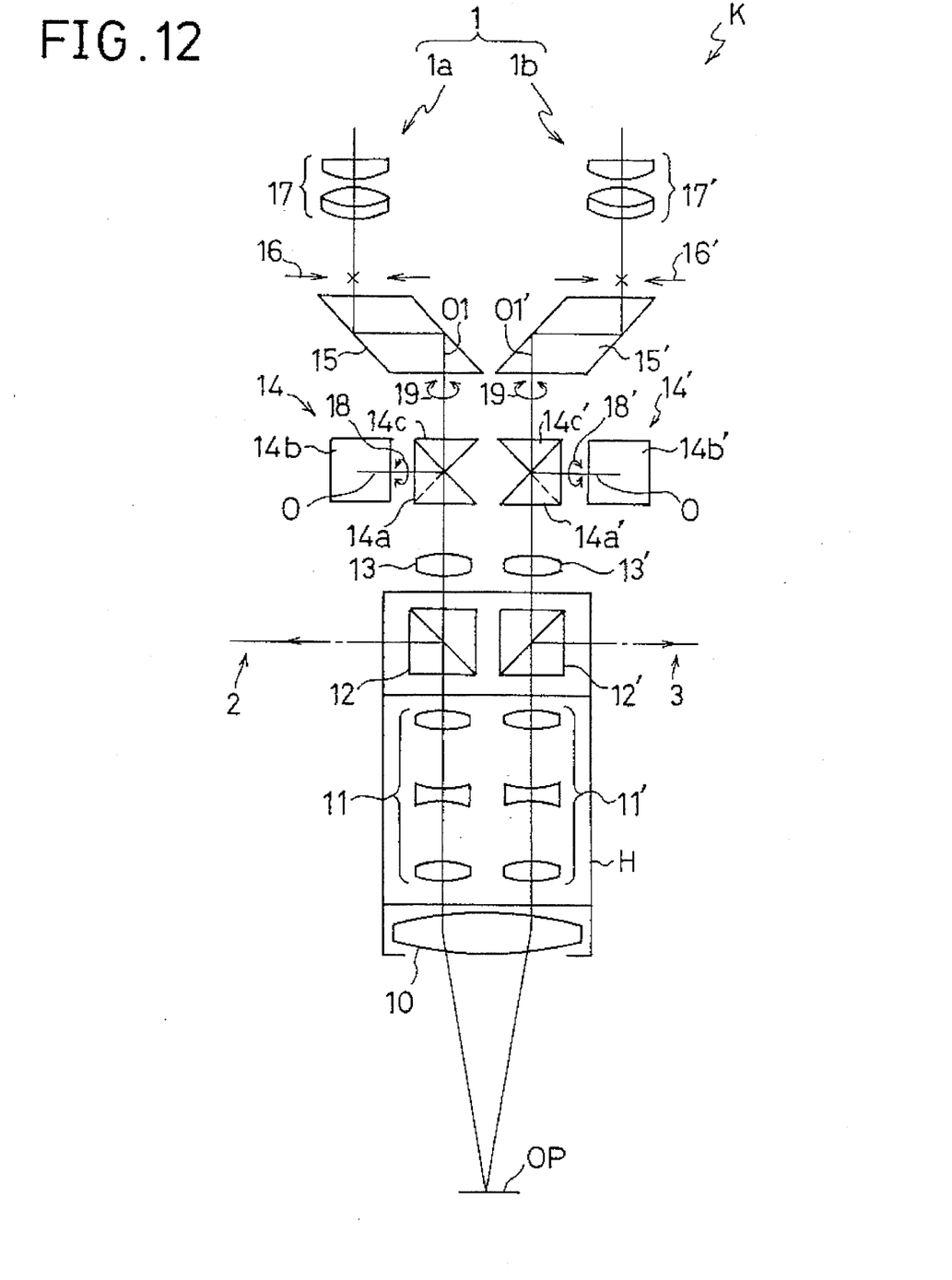
FIG. 12 is a schematic descriptive drawing showing an example of the optical system of a binocular stereoscopic microscope.
Figure 13:
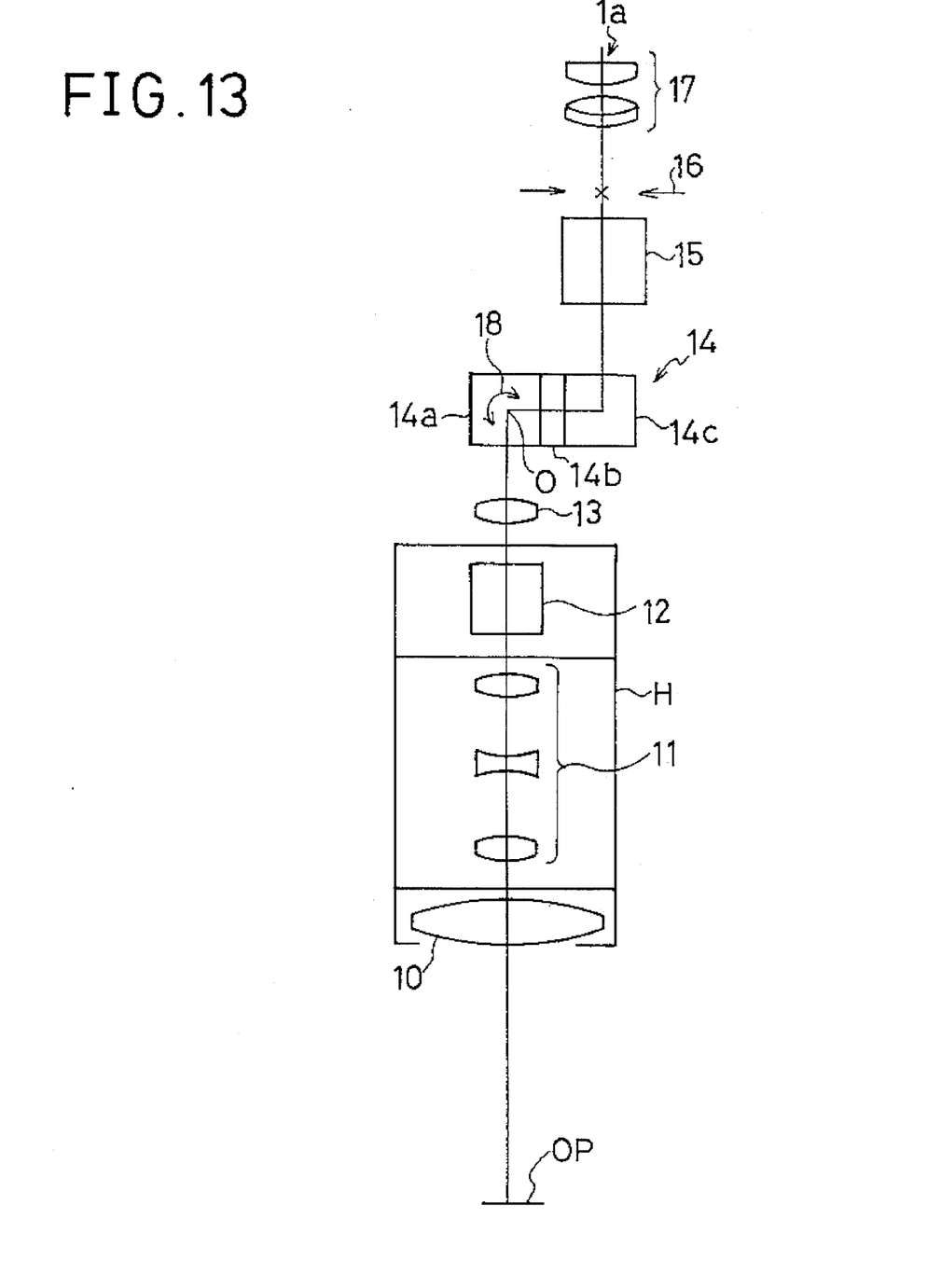
FIG. 13 is a side view of FIG. 12.

This type of binocular stereoscopic microscope K may for example comprise, as shown in FIG. 12, a main observing optical system 1, an auxiliary sub-observing optical system 2 (detailed drawing omitted) which branches off from the main observing optical system 1, and an electronic camera system 3 (detailed drawing omitted) which also branches off from the main observing optical system 1.

Referring to FIG. 12, the main observing optical system 1 comprises a left-hand/right-hand pair of observing optical systems 1a, 1b. The left-hand optical system 1a comprises an objective lens 10, magnifying lens 11, beam splitter 12, imaging lens 13, porroprism 14 (erecting prism), diamond-shaped prism 15, field diaphragm 16 and eyepiece 17 in that order. In the figure, H houses the objective lens 10, magnifying lens 11 and beam splitter 12.

This porroprism 14 comprises a rectangular prism 14a on the incidence side, an intermediate rectangular prism 14b and a rectangular prism 14c on the emergence side. The microscope parts from this porroprism 14 to the eyepiece 17 are housed in an eyepiece tube B.

The rectangular prism 14a on the incidence side is fixed. The eyepiece tube B is free to rotate about a reflection axis 0 of the rectangular prism 14a as shown by the arrow 18, and the diamond-shaped prism 15 is free to rotate about an incidence axis 01 as shown by the arrow 19.

The observing optical system 1b has the same composition as the observing optical system 1a, so its description will be omitted, parts of the system 1b corresponding to parts of the system 1a being referred to by the same symbols with dashes ('). The sub-observing optical system 2 branches off from the beam splitter 12, and the electronic camera optical system 3 branches off from the beam splitter 12'.

In the aforesaid construction, the optical parts from the intermediate rectangular prisms 14b, 14b' to the eyepieces 17, 17', may be rotated about the reflection axes 0, 0' so as to vary the height of the eyepieces 17, 17'. Further, by rotating the diamond-shaped prisms 15, 15' about the incidence axes 01, 01', the interoptic axis distance of the eyepieces 17, 17' may be varied. The operator observes a subject OP via these observing optical systems 1a, 1b.

This type of binocular stereoscopic microscope is widely used in engineering and medicine. Its purpose is not only to magnify a subject, but also to permit fine precision operations to be performed.

A binocular stereoscopic microscope is therefore required to allow the user (operator) to perform operations easily. For example, it should provide a suitable magnification, have a wide visual field so as to permit rapid alignment, and allow the operator to work in a comfortable position.

Figure 14:
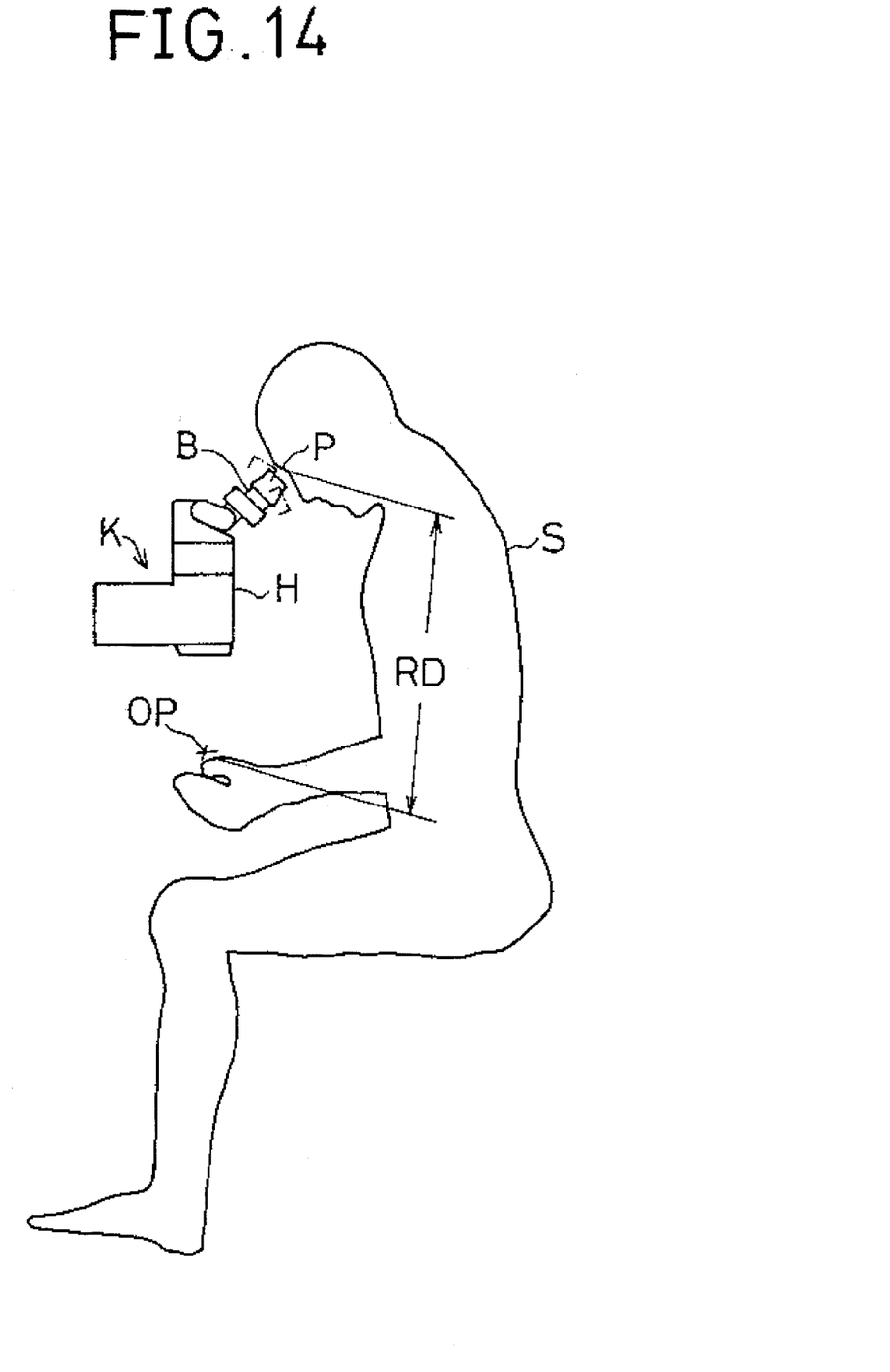
FIG. 14 is a descriptive drawing of an example of the use of the binocular stereoscopic microscope of FIGS. 12 and 13.

FIG. 14 shows such a binocular stereoscopic microscope K used for performing ophthalmic surgery. In this example, an operator F is looking down at an angle of 45°, but if the operator is short, his eyes (eye point P) will be at a lower position than that shown in the figure.

In such a case, it would be desirable to move the microscope K downwards, however as the distance between the microscope K and the observation area OP of the patient (not shown) is very small, it is actually impossible to move the microscope down.

The eyepiece tube B housing the optical parts from the intermediate rectangular prisms 14b, 14b' to the eyepieces 17, 17' was therefore rotated downwards about the reflection axes 0, 0' so as to reduce the elevation of the eyepiece tube B, and thereby move the operator's eye point P downwards.

However, as the porroprisms 14, 14' are disposed above the beam splitters 12, 12' and the imaging lenses 13, 13', there was a limit to how much the elevation of the eyepiece tube B could be reduced so as to move the operator's eye point P downwards.

To solve this problem, the eyepiece tube B could be disposed so that it rotated up and down about an axis at the side of the holder H.

However, if this arrangement were adopted, the dimensions of the binocular stereoscopic microscope increase in a front-back direction, and if the elevation of the eyepiece tube B is low, the operator's eye point P has to move further back than the microscope K. The operator's reaching distance RD, i.e. the distance from the observation area OP (undergoing surgery) to the eye point P, therefore increases.

Figure 15:
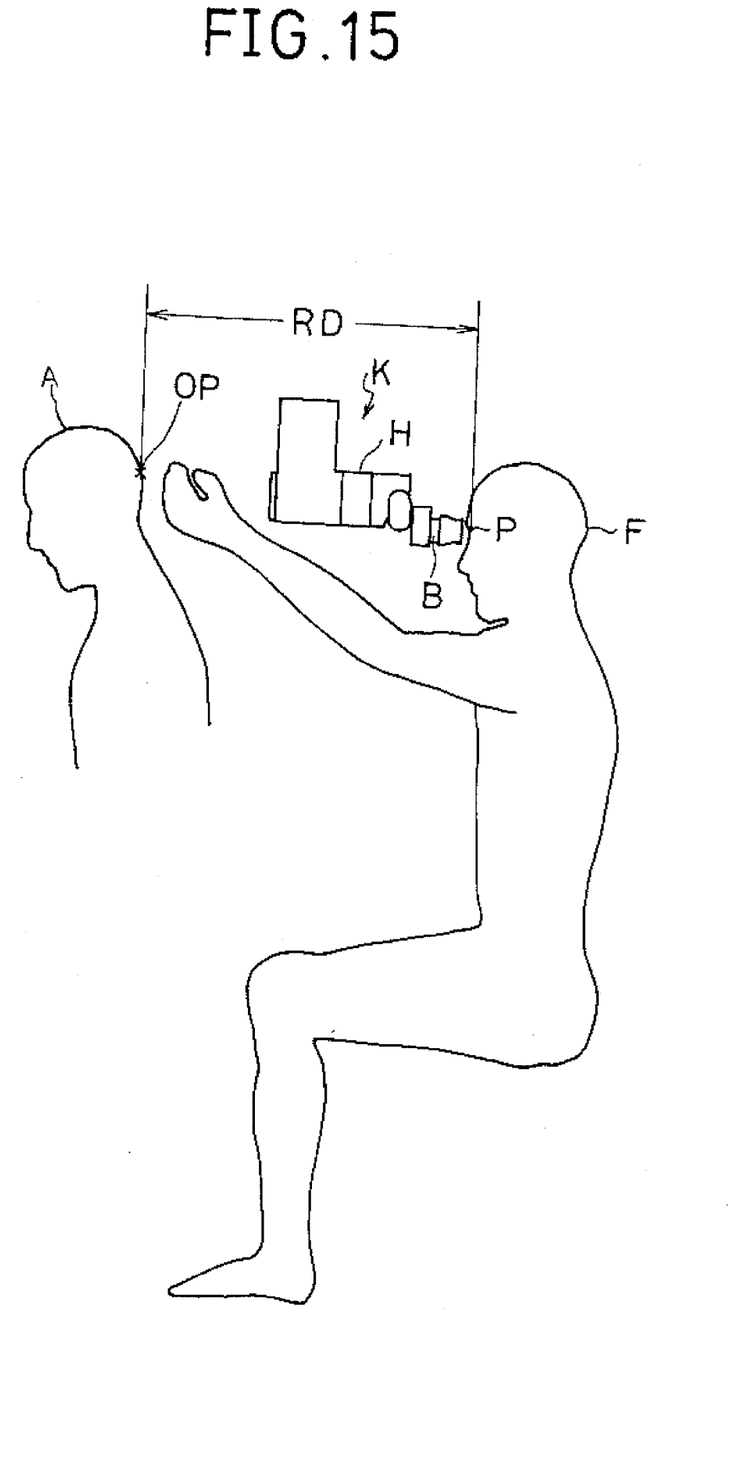
FIG. 15 is a descriptive drawing of another example of the use of the binocular stereoscopic microscope of FIGS. 12 and 13.

FIG. 15 shows an example of the use of a binocular stereoscopic microscope K to perform a surgical operation wherein the microscope is horizontal. As it is impossible to reduce the elevation angle of the eyepiece tube B, the reaching distance RD from a part of a patient A undergoing surgery, i.e. the observation area OP, to the eye point P, increases.

Conventionally, therefore, the operator had to extend his arms to perform surgical procedures, and if the operator was of small stature, he occasionally could not reach the part of the patient to be operated upon.

SUMMARY OF THE INVENTION

It is therefore an object of the invention to provide a binocular stereoscopic microscope offering a wide range of elevation angles, wherein the distance over which the operator has to extend his hands forward is shorter, and wherein surgical procedures can be performed in a comfortable position.

In order to achieve the aforesaid object, a binocular stereoscopic microscope is provided wherein light incident on an objective lens and reflected from an observation area is guided along a pair of optical paths each including an imaging lens, image erecting means and eye width adjusting means through left and right eyepieces respectively, a plurality of optical members comprising the image erecting means can rotate around an optic axis perpendicular to the incidence axis on the image erecting means, and the eye width adjusting means can be rotated around the incidence axis of the reflected light on the eye width adjusting means, a reflecting member being provided for causing the reflected light which has passed through the imaging lens to undergo a plurality of reflections and for guiding the light to the side of the optic axis of the imaging lens, and the image erecting means being disposed adjacent to this reflecting member such that a light beam from the member is incident on it.

The invention is characterized in that the image erecting means is a Type II porroprism comprising an incidence rectangular prism, intermediate rectangular prism and emergence rectangular prism, the distance between the optic centers of the emergence rectangular prisms is arranged to be greater than the distance between the optic centers of the incidence rectangular prisms of the pair of image erecting means, and the reflecting surface of the emergence rectangular prisms is arranged to have a greater surface area than that of the reflecting surface of the incidence rectangular prism.

The invention is characterized in that a second imaging lens is disposed between the reflecting member and image erecting means.

The invention is characterized in that if the optic axis of the light beam incident on the emergence optical member is the incidence axis, and the optic axis of the light beam emitted by the emergence optical member after a plurality of reflections inside this member is the emergence axis, the emergence optical member is arranged such that the angle of the emergence axis, i.e. the emergence deflection angle, with respect to the incidence axis, is less than 90°.

The invention is characterized in that the emergence deflection angle is set to be equal to 45° or close to 45°.

These and other objects, features and advantages of the present invention will be well appreciated upon reading of the following description of the invention when taken in conjunction with the attached drawings with the understanding that some modifications, variations and changes of same could be made by a skilled person in the art to the which the invention pertains without departing from the spirit of the invention or the scope of the claims appended hereto.

DESCRIPTION OF THE PREFERRED EMBODIMENT

An embodiment of this invention will now be described with reference to FIGS. 1–9.

Figure 1:
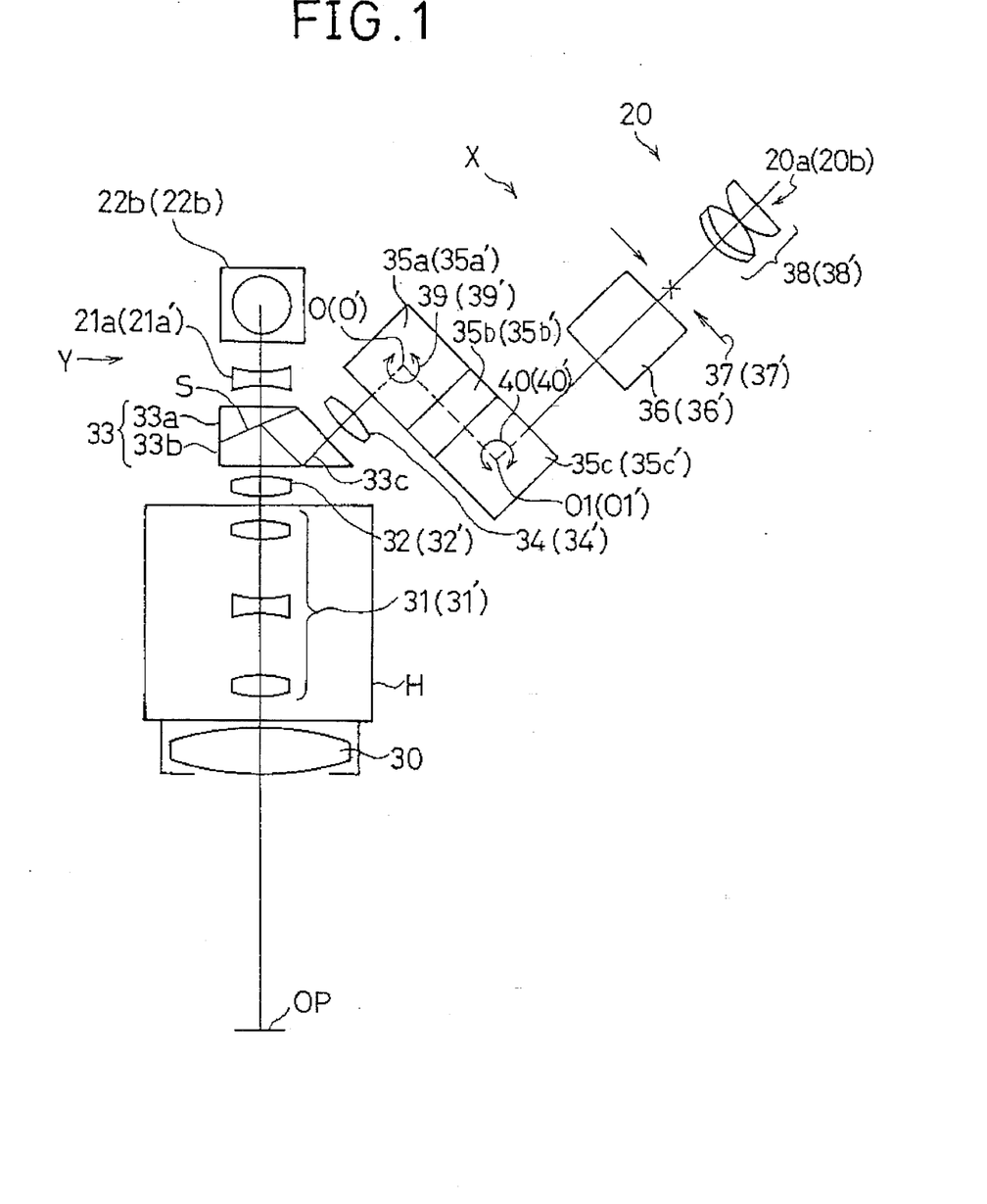
FIG. 1 is a schematic profile view of the optical system of the binocular stereoscopic microscope according to this invention.
Figure 2:
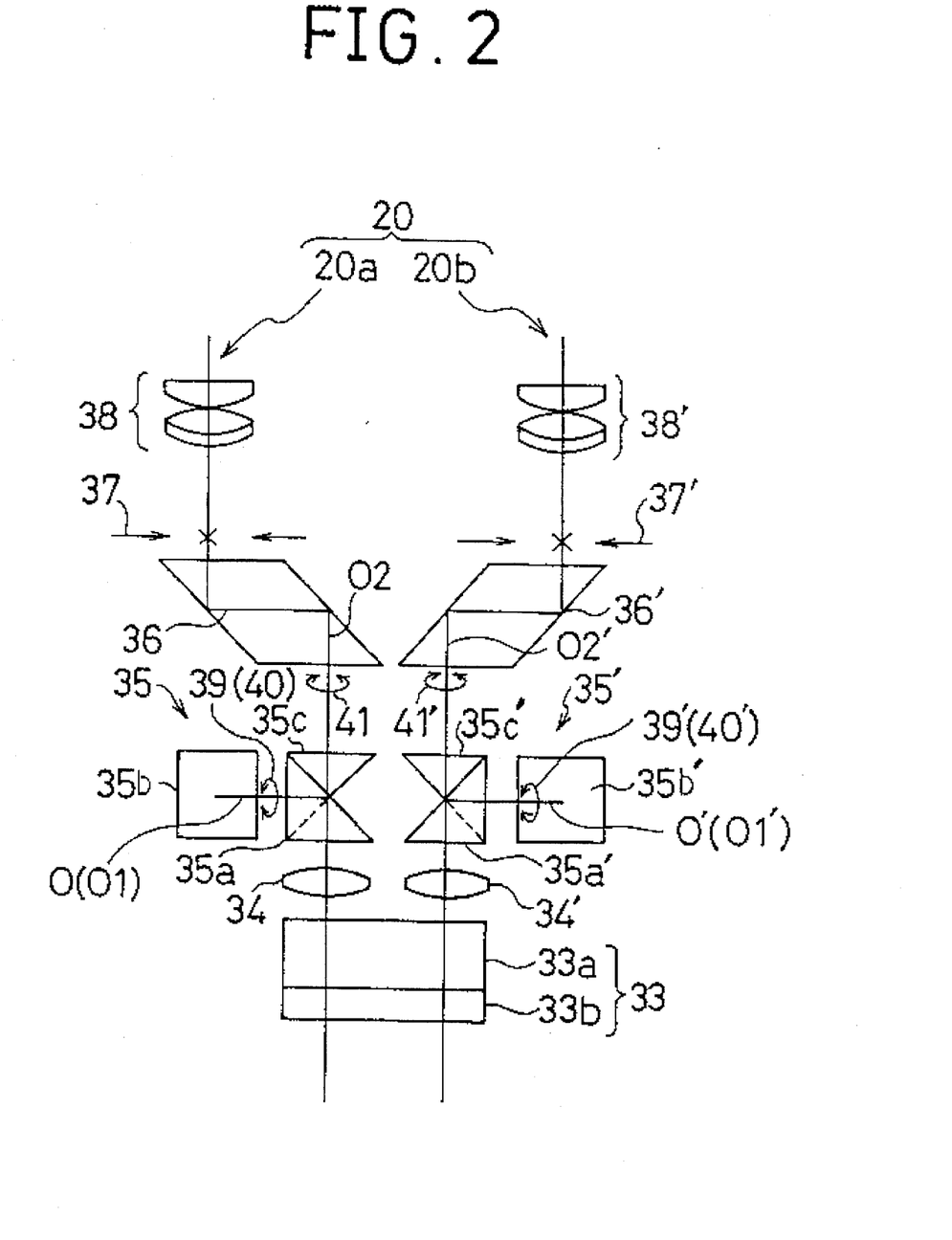
FIG. 2 is a descriptive drawing of part of the optical system of FIG. 1 viewed from the direction marked X.

As shown in FIGS. 1 and 2, the binocular stereoscopic microscope according to this invention comprises a main observing optical system 20, an auxiliary sub-observing optical system 21 branching off from the main observing optical system 20 (details omitted), and an electronic camera system 22 branching off from the main observing optical system 20 (details omitted).

The main observing optical system 20 comprises an objective lens 30, and a left-hand/right-hand pair of observing optical systems 20a, 20b. This observing optical system 20a comprises a magnifying lens 31, first imaging lens 32, beam splitting prism 33 (reflecting optical member), second imaging lens 34, porroprism 35 (image erecting means), diamond-shaped prism 36 (eye width adjusting means), field diaphragm 37 and eyepiece 38 in that order. In the figure, H is a holder housing the objective lens 30 and magnifying lens 31.

By splitting the conventional imaging lens into a first and second imaging lens 32, 34 in this way, the optical path length is lengthened by the prism 33, and the desired focal length can thus be obtained.

Figure 4:
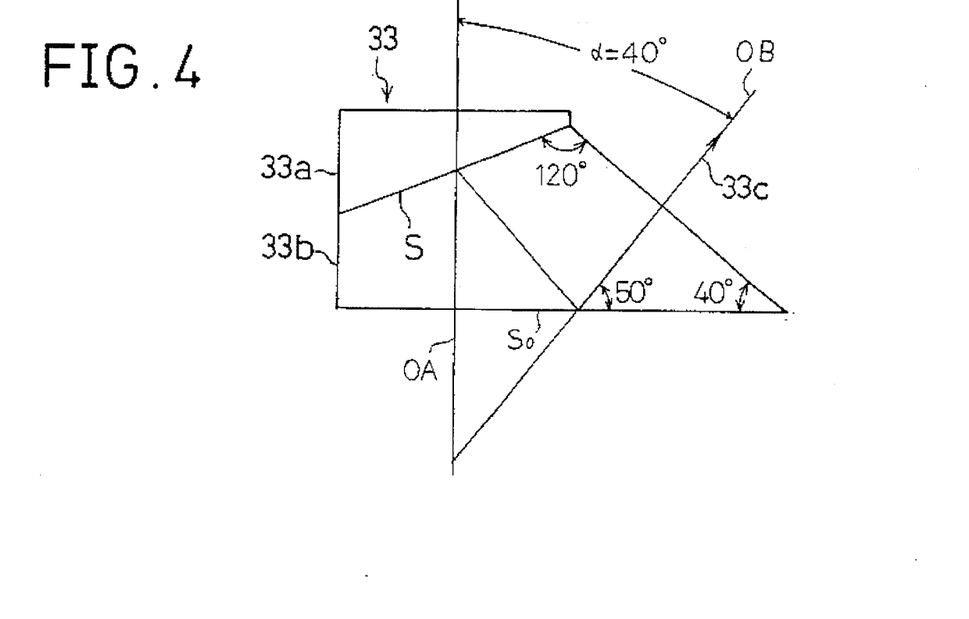
FIG. 4 is an enlarged descriptive view of the light beam splitting prism of FIG. 1.

The prism 33 comprises deflecting or a D prism 33a and a double reflecting downward deflecting prism 33b. This prism 33 has a splitting surface S which splits the incident light beam into two beams with deflections of 40° and 0°. In other words, the downward deflecting prism 33b gives a double reflection to the reflected beam 33c which has passed through the first imaging lens 32 so as to emit a light beam at a direction of 50° as shown in FIGS. 1 and 4. This light beam is guided to the side of the optic axis of the first imaging lens 32.

In FIG. 4, if the optic axis of the light beam incident on the prism 33, which is a light emitting member, is OA, and the optic axis of the light beam emerging from the prism 33 after a plurality of reflections inside this prism 33 is OB, the prism 33 is set such that the angle of the emergence optic axis OB with respect to the plane SO which is perpendicular to the incidence optic axis OA, i.e. the emergence deflection angle α, is less than 90°. It is particularly to be preferred that this emergence deflection angle is 45° or in the region of 45°. In this embodiment, therefore, this angle α is set to 50°. The angle α however is not necessarily 45° or in the region of 45° provided that it is less than 90°.

Figure 5:
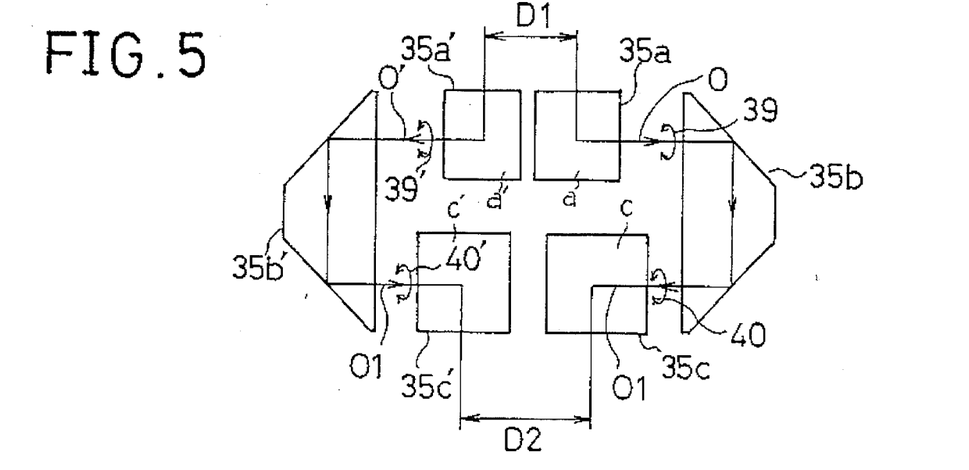
FIG. 5 is a view showing the internal construction of the porroprism of FIG. 1.
Figure 6:
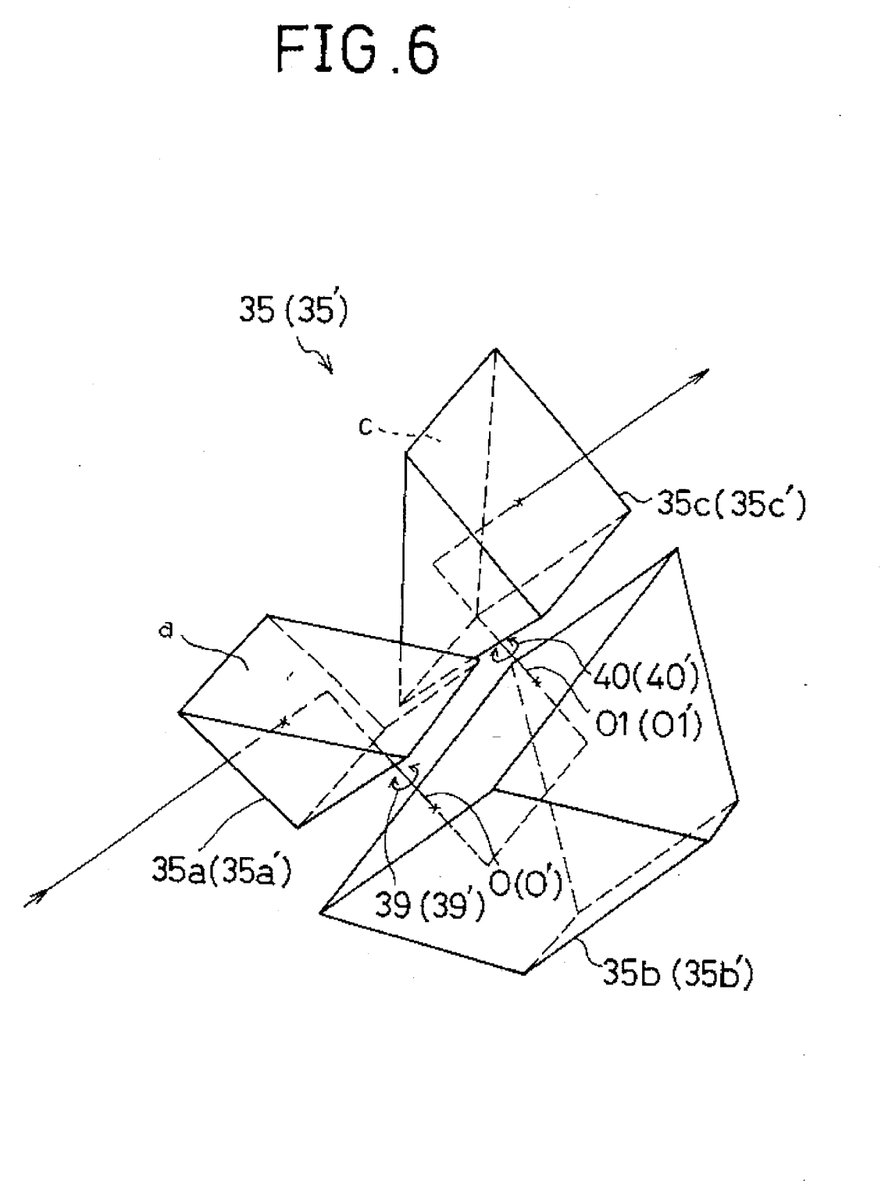
FIG. 6 is a perspective view of the porroprism of FIG. 1.

As shown in FIGS. 2, 5 and 6, the porroprism 35 is a Type II porroprism comprising an incidence rectangular prism 35a, intermediate rectangular prism and emergence rectangular prism 35c. This porroprism 35 is disposed adjacent to the side of the downward deflecting prism 33b so that the light beam from the prism 33b, which is a reflecting optical member, can impinge on it. As shown in FIG. 5, the reflecting surface c of the emergence rectangular prism 35c is arranged to have a larger surface area than the reflecting surface a of the incidence rectangular prism 35a. The optical members from this porroprism 35 to the eyepiece 38 are housed in an eyepiece tube, not shown.

Figure 7:
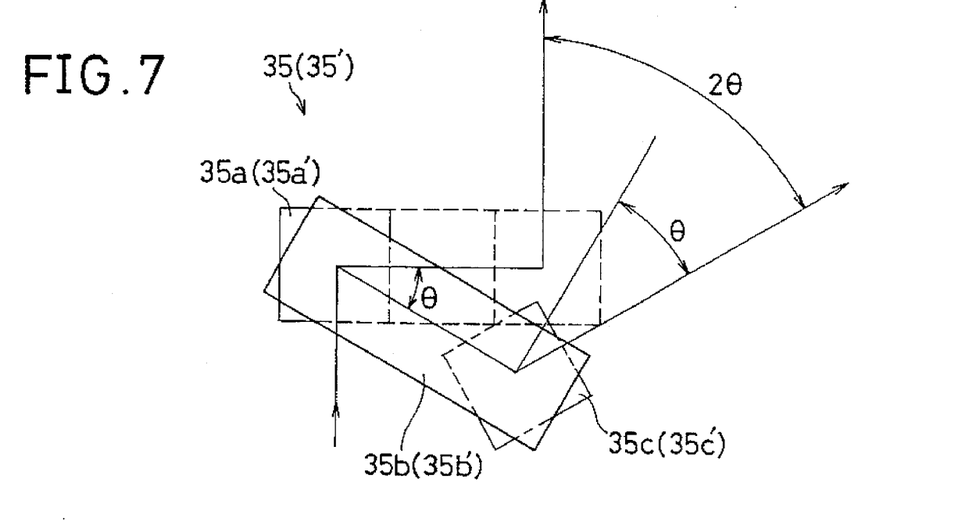
FIG. 7 is a drawing showing the function of the porroprism of FIG. 1.
Figure 8:
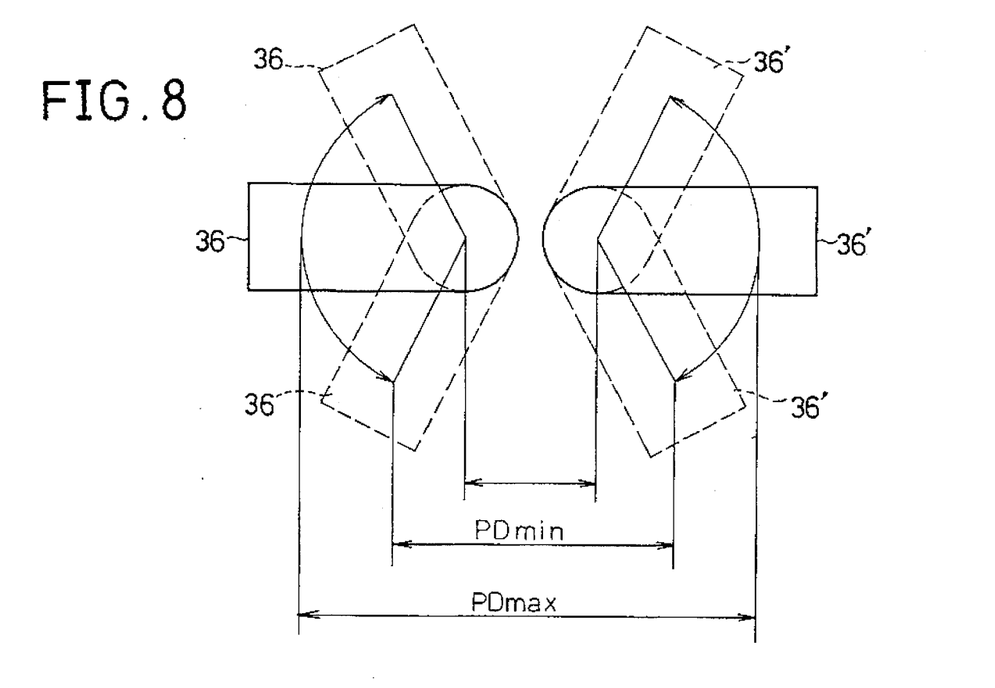
FIG. 8 is a drawing showing the function of the diamond-shaped prism of FIG. 1.

The incidence rectangular prism 35a is fixed in the holder H, the optical members from the intermediate rectangular prism 35b to the eyepiece 38 being free to rotate in the direction of the arrow 39 about the reflection axis 0 of the incidence rectangular prism 35a shown in FIGS. 5–7. The optical members from the emergence rectangular prism 35c to the eyepiece 38 are free to rotate in the direction of the arrow 40 about the optic axis 01 of the intermediate rectangular prism 35b, and the diamond-shaped prism 36 is free to rotate in the direction of the arrow 41 about the incidence axis 02 on the prism 36 as shown in FIGS. 2 and 8.

Further, as shown in FIG. 7, the intermediate rectangular prism 35b and the emergence rectangular prism 35c are connected together such that when the intermediate rectangular prism 35b is rotated by an angle θ with respect to the incidence rectangular prism 35a, the emergence rectangular prism 35c is rotated by an angle θ with respect to the intermediate rectangular prism 35b. As a result, the emergence axis 03 from the porroprism 35b rotates through an angle 2θ. This connecting mechanism may consist of a link, gears or cams.

By means of this construction, the image can be maintained erect and the beam width in the prisms 35a–35c is constant. The effective dimensions of the prism need only be as large as the beam width and the apparatus can be made compact.

The observing optical system 20b has a similar construction to that of the observing optical system 20a, parts of the system 1b corresponding to parts of the system 1a being referred to by the same symbols with dashes ('). Further, the inter-optic center distance D2 between the emergence rectangular prisms 35c, 35c' is arranged to be larger than the inter-optic center distance D1 between the incidence rectangular prisms 35a, 35a of the pair of porroprisms 35, 35'. D1 is the distance between the optic axes of the magnifying lenses 31, 31', and D2 is the distance between the incidence axes 02, 02' of the diamond-shaped prisms 36, 36' which adjust for eye width. By setting D2>D1, and arranging the surface area of the reflecting surface c to be greater than that of the reflecting surface a, sufficient space for eye width adjustment can be maintained even if the diamond-shaped prisms 36, 36' are made larger in order to widen the visual field.

Figure 3:
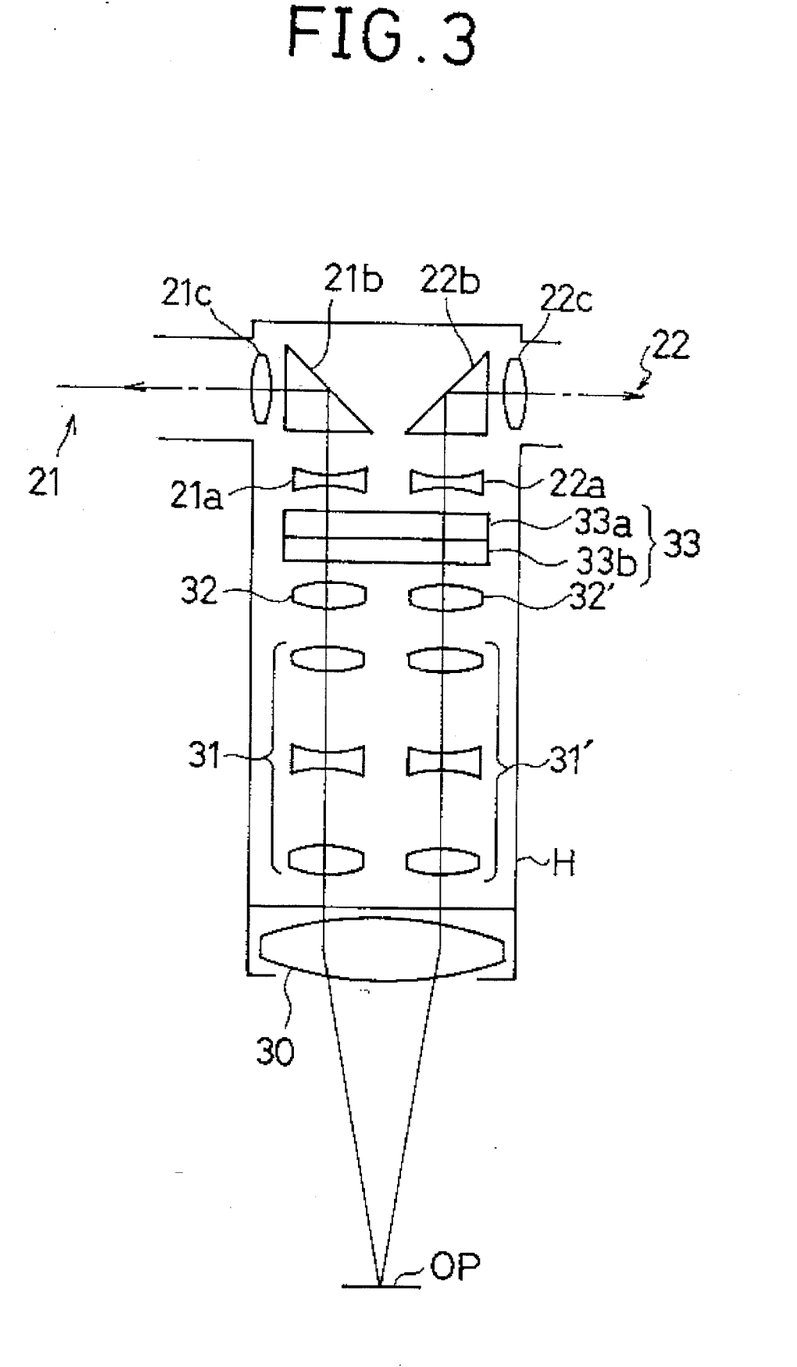
FIG. 3 is a descriptive drawing of part of the optical system of FIG. 1 viewed from the direction marked Y.

As shown in FIG. 3, the sub-observing optical system 21 branches off from the prism 33, and comprises a lens 21a, prism 21b, imaging lens 21c with other optical parts, not shown. The electronic camera system 3 also branches off from the prism 33, and comprises a lens 22a, prism 22b, imaging lens 22c with other optical parts, not shown. The lenses 32, 21a and 21c and the lenses 22a, 22b and 22c together form a focal relay system of unit magnification so as to retain compatibility with the conventional sub-observing optical system and the electronic camera system.

Next, the operation of the binocular stereoscopic microscope having the aforesaid construction will be described.

Reflected light from the area under observation OP is caused to be incident on the objective lens 30, and is guided to the observer's eyes via the observing optical systems 20a, 20a'.

In other words, in the observing optical system 20a, reflected light from the area under observation OP is caused to be incident on the objective lens 30, and is guided to the eyepiece 38 via the magnifying lens 31, first imaging lens 32, beam splitting prism 33 (reflecting member), second imaging lens 34, porroprism 35 (erecting prism), diamond-shaped prism 36 and field diaphragm 37. At the same time, in the observing optical system 20b, reflected light from the area under observation OP is caused to be incident on the objective lens 30, and is guided to the eyepiece 38' via the magnifying lens 31', first imaging lens 32', beam splitting prism 33' (reflecting member), second imaging lens 34', porroprism 35' (erecting prism), diamond-shaped prism 36' and field diaphragm 37'. When the eyepiece tube, not shown, is rotated up or down, the intermediate rectangular prism 35b is rotated by an angle θ with respect to the incidence rectangular prism 35a, and due to the linking mechanism of the intermediate rectangular prism 35b, not shown, the emergence rectangular prism 35c is rotated by an angle θ with respect to the intermediate rectangular prism 35b. As a result, the emergence axis 03 from the porroprism 35 rotates through an angle 2θ. The height of the eyepieces 38, 38' can therefore be adjusted to suit the observer's eye point.

Figure 9A:
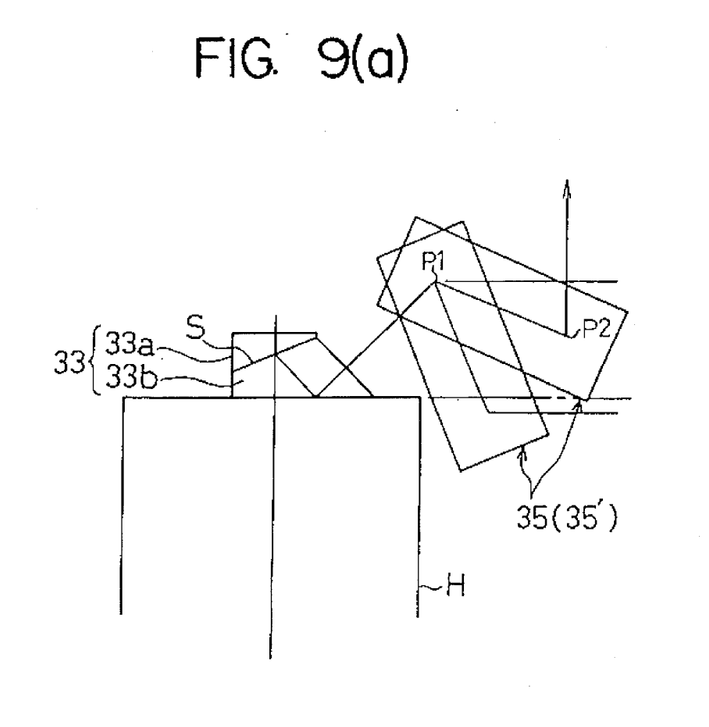
FIG. 9(a) is a drawing showing functions of the principal parts of this invention with porroprisms partially installed in a holder.
Figure 9B:
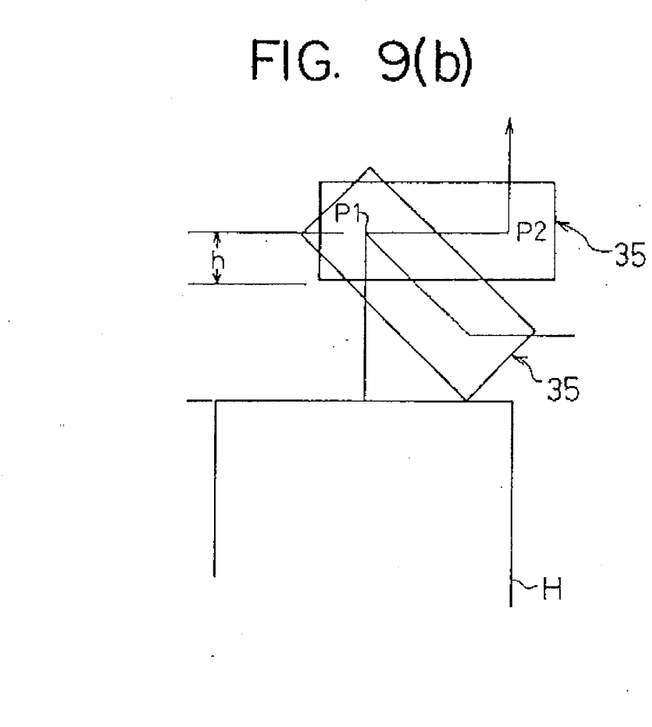

In this construction, i.e. in the construction shown in FIG. 9 (a), the height can be reduced by h compared to the case where the whole porroprisms 35, 35' are entirely installed in the holder H as shown in FIG. 9(b).

Further, if the porroprisms 35, 35' are disposed near the prism 3, the front-back dimensions of the binocular stereoscopic microscope need not be so large compared to the conventional case where the porroprisms are installed at the side of the holder H.

In the aforesaid embodiment, the case has been described where the light beam was reflected twice by the deflecting prism 33b and guided to the side, but the invention is not limited to this example.

Figure 10:
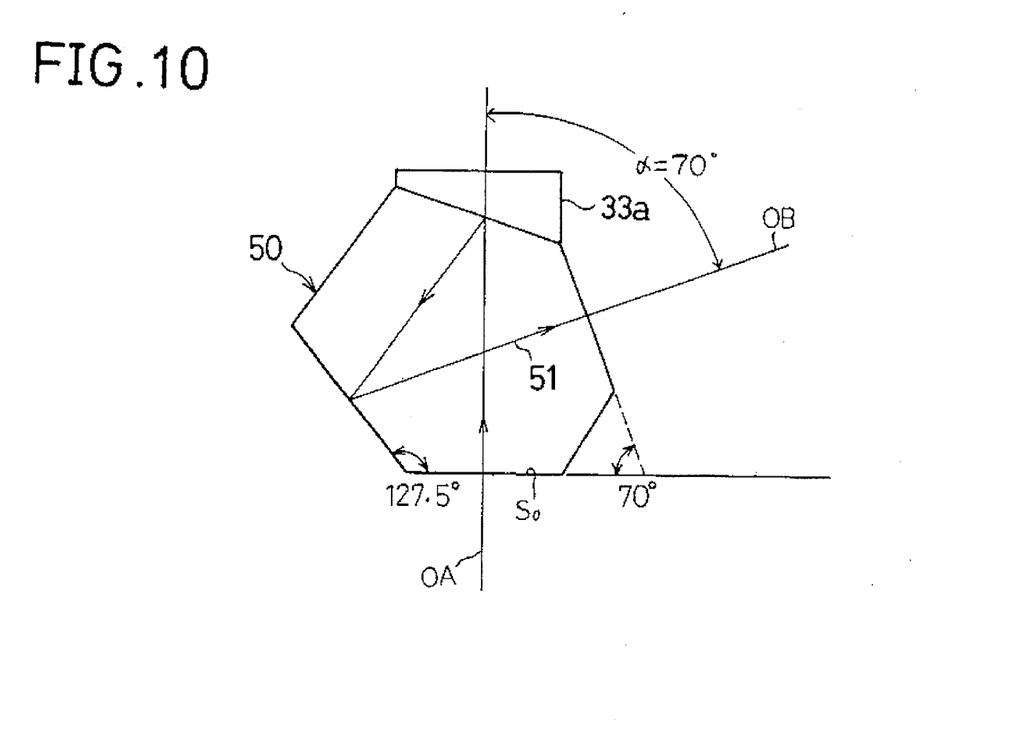
FIG. 10 is a descriptive drawing showing another example of the light beam splitting prism of FIG. 1.
Figure 11:
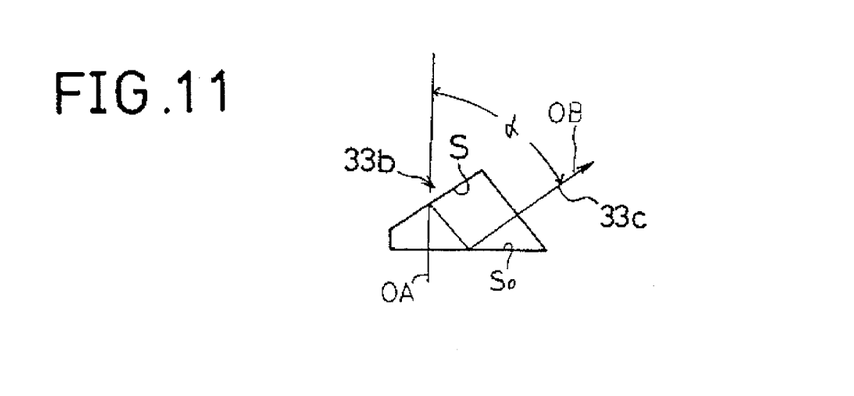
FIG. 11 is a descriptive drawing showing an example of a modification of the light beam splitting prism of FIG. 1.

As shown in FIG. 10, for example, the light beam can also be reflected twice by a pentaprism 50, and the light beam 51, i.e. the emergence axis OB of the light beam 51, emitted at an emergence deflection angle of 20° so as to impinge on the porroprism 35. The D prism 33a may also be omitted, and the reflecting surface S used as a full reflecting surface.

As described hereintofore, according to a preferred embodiment of the invention a reflecting member is provided which causes light which has passed through the imaging lens to be reflected a plurality of times, and guides it to the side of the optic axis of the imaging lens. The erecting means is disposed near to the side of this reflecting member so that the light beam from the reflecting member can impinge upon it. In this way the range of operating angles can be increased, the operator has to extend his hands forward over a shorter distance, and the operator can work in a more comfortable position.

Further, according to the preferred embodiment of the invention this erecting means consists of a Type II porroprism comprising an incidence rectangular prism, an intermediate rectangular prism and an emergence rectangular prism. The inter-optic center distance between the emergence prisms is set larger than that between the incidence prisms of the pair of erecting means, and the surface area of the reflecting surface of the emergence prism is set larger than that of the reflecting surface of the incidence prism. Even if the eye width adjusting means is made larger to widen the visual field, therefore, it is easy to ensure sufficient space for eye adjustment.

What is claimed is:

1. A binocular stereoscopic microscope wherein light incident on an objective lens and reflected from an observation area is guided along a pair of optical paths each including an imaging lens, image erecting means for receiving light from said imaging lens and for transmitting an erect image, and eye width adjusting means for receiving light from the image erecting means and for transmitting light to left and right eyepieces, said image erecting means comprising optical elements free to rotate around an optic axis perpendicular to an axis of incidence light on said image erecting means, and said eye width adjusting means being free to rotate around an axis of incidence light on said eye width adjusting means, characterized in that a reflecting member is provided for performing a plurality of reflections on light which has passed through said imaging lens, and said image erecting means being disposed adjacent to said reflecting member such that a light beam from said reflecting member is incident upon said image erecting means.

2. A binocular stereoscopic microscope as defined in claim 1, characterized in that the image erecting means is a Type II porroprism comprising an incidence rectangular prism, an intermediate rectangular prism, and an emergence rectangular prism, the distance between the optic centers of the emergence rectangular prism being greater than the distance between the optic centers of the incidence rectangular prisms of the image erecting means, and a reflecting surface of the emergence rectangular prism having a greater surface area than that of a reflecting surface of the incidence rectangular prism.

3. A binocular stereoscopic microscope as defined in claim 1 characterized in that a second imaging lens is disposed between said reflecting member and said image erecting means.

4. A binocular stereoscopic microscope as defined in claim 1, wherein said reflecting member comprises an emergence optical member characterized in that if the optic axis of the light beam incident on the emergence optical member is the incidence axis, and the optic axis of the light beam emitted by the emergence optical member after a plurality of reflections inside the emergence optical member is the emergence axis, the emergence optical member is arranged such that the angle of the emergence axis with respect to said incidence axis, is less than 90°.

5. A binocular stereoscopic microscope as defined in claim 4 characterized in that the angle of the emergence axis with respect to said incidence axis is set to be equal to 45° or close to 45°.

6. A binocular stereoscopic microscope comprising a main observing optical system wherein light incident on an objective lens and reflected from an observation area is guided along a pair of optical paths each including an imaging lens, a porroprism as image erecting means for receiving light from said imaging lens and for transmitting an erect image, and eye width adjusting means for receiving light from the image erecting means and for transmitting light to left and right eyepieces, said image erecting means comprising optical elements free to rotate around an optic axis perpendicular to an axis of incidence light on said porroprism, said eye width adjusting means being free to rotate around an axis of incident light on said eye width adjusting means, a reflecting member being provided for performing a plurality of reflections on light which has passed through said imaging lens, and said porroprism being disposed adjacent to said reflecting member such that a light beam from said reflecting member is incident upon said porroprism, characterized in that said reflecting member comprises two prisms which are united with each other and a surface formed therebetween, said surface reflecting a part of incidence light on said reflecting member so as to be guided to said porroprism and transmitting the remains thereof, and said remains which have passed through said surface and said reflecting member being received by an electronic camera system.

7. A binocular stereoscopic microscope wherein light incident on an objective lens and reflected from an observation area is guided along a pair of optical paths, said microscope comprising image erecting means for receiving light from said objective lens and for transmitting an erect image, eye width adjusting means for receiving light from the image erecting means and for transmitting light to left and right eyepieces, said image erecting means including optical elements free to rotate around an optic axis perpendicular to an axis of incidence light on said image erecting means, and said eye width adjusting means being free to rotate around an axis of incidence light on said eye width adjusting means, wherein a reflecting member is provided for performing a plurality of light reflections, and said image erecting means is disposed adjacent to said reflecting member such that a light beam from said reflecting member is incident upon said image erecting means.

\* \* \* \* \*